United States Patent
Huang

(10) Patent No.: US 8,931,355 B2
(45) Date of Patent: Jan. 13, 2015

(54) TORQUE SENSING GEAR STRUCTURE OF AN ELECTRONIC BIKE

(71) Applicant: Yung-Sung Huang, Taipei (TW)

(72) Inventor: Yung-Sung Huang, Taipei (TW)

( * ) Notice: Subject to any disclaimer, the term of this patent is extended or adjusted under 35 U.S.C. 154(b) by 76 days.

(21) Appl. No.: 13/931,513

(22) Filed: Jun. 28, 2013

(65) Prior Publication Data
US 2014/0150569 A1 Jun. 5, 2014

(30) Foreign Application Priority Data
Dec. 3, 2012 (TW) .............................. 101145256 A

(51) Int. Cl.
*G01L 3/02* (2006.01)
*G01L 3/10* (2006.01)
*B62M 6/50* (2010.01)
*G01L 3/14* (2006.01)

(52) U.S. Cl.
CPC .................. *G01L 3/102* (2013.01); *B62M 6/50* (2013.01); *G01L 3/1435* (2013.01)
USPC .................................................. 73/862.333

(58) Field of Classification Search
USPC ....................... 73/862.333–862.335
See application file for complete search history.

(56) References Cited

U.S. PATENT DOCUMENTS

| | | | | |
|---|---|---|---|---|
| 5,560,266 A | * | 10/1996 | Shikimori et al. | 74/594.1 |
| 5,880,585 A | * | 3/1999 | Oguro | 324/174 |
| 5,941,333 A | * | 8/1999 | Sun et al. | 180/206.4 |
| 6,162,140 A | * | 12/2000 | Fukuda | 474/70 |
| 6,513,395 B1 | * | 2/2003 | Jones | 73/862.333 |
| 7,001,294 B2 | * | 2/2006 | Fukuda | 474/102 |
| 7,621,842 B2 | * | 11/2009 | Kamiya et al. | 475/296 |
| 7,959,529 B2 | * | 6/2011 | Braedt | 474/160 |
| 2014/0076656 A1 | * | 3/2014 | Tanaka et al. | 180/446 |

* cited by examiner

*Primary Examiner* — Max Noori
(74) *Attorney, Agent, or Firm* — Muncy, Geissler, Olds & Lowe, P.C.

(57) ABSTRACT

The primary objective of the present invention is to provide a torque sensing gear structure of an electronic bike, which uses a torque sensing unit mounted on the driving shaft of the bike to detect the torque generated by the user's feet when he/she is riding the bike so as to calculate the resistance generated by the user and to drive the electronic driving device to support the user for riding the bike. By this way, the loading of riding the bike could be reduced instantly.

10 Claims, 4 Drawing Sheets

TORQUE SENSING GEAR STRUCTURE OF AN ELECTRONIC BIKE

CROSS-REFERENCE TO RELATED APPLICATION

This application claims the benefit of Taiwan Patent Application No. 101145256, filed on Dec. 3, 2012, in the Taiwan Intellectual Property Office, the disclosure of which is incorporated herein in its entirety by reference.

BACKGROUND OF THE INVENTION

1. Field of the Invention

The invention relates to a torque sensing gear structure, and more particularly to a torque sensing gear structure of an electronic bike for sensing relative torque.

2. Description of the Related Art

Bicycles are one of recreational sports and tools that are widely applied, and a principal concept of bicycles is that the sprockets are stepped by riders to drive rear wheels for rotating, so as to form a power source for forward motion. However, when a user rides a bicycle to reach an uphill terrain having slope or needs to ride the bicycle for a long distance or may have insufficient stepping force or gets tired from riding the bicycle, the foregoing situations may affect riding. More specifically, regarding the elderly people, females or children, long riding distance may be an obstacle. To overcome the foregoing defect, an electric bicycle then is developed.

Since the technology is continuously advanced, not only can the electric bicycle helps the rider through propulsive force, design is also gradually becoming automated, so that different degrees of propulsive force support is selectively provided to the user based on the resistance intensity that is encountered and faced by the user. The biggest technical bottle neck in the development is how to determine the force strength used by the rider as a basis of facing the resistance. In current technology, there is no effective system to precisely perform measurement. Therefore, the inventor(s) of the invention designs a torque sensing gear structure to overcome the shortcoming of prior art, thereby increasing industrial application.

SUMMARY OF THE INVENTION

Therefore, it is a primary objective of the present invention to provide a torque sensing gear structure having novelty, non-obvious and industrial utilization to overcome the difficulty of current technology.

To achieve the foregoing objectives, the technical means of the invention is to design a torque sensing gear structure comprising:

a main sprocket base being a holder for fastening at least a driving sprocket of a bicycle, an external ring of the main sprocket base extended and disposed with a plurality of fastening racks, a shaft hole piercing through the main sprocket base to provide a stepping shaft of the bicycle passing thereto, a connection ring structure forwardly extended and disposed to the main sprocket base, an external ring wall surface of the connection ring structure disposed with a plurality of snap blocks mutually spaced, an arrangement space formed between the snap blocks, a flexible element arranged in the arrangement space, a snap slot concavely disposed to each snap block at a same turning place, a bottom wall of each snap slot disposed with a sliding hole, a first ring groove concavely disposed to a rear sidewall surface of the main sprocket base, the first ring groove overlapped each sliding hole, a second ring groove corresponding to an inner side of the first ring groove further concavely disposed and concentrically arranged together with the first ring groove; a first magnetic ring correspondingly disposed in the first ring groove, a plurality of first magnetic members disposed at a same interval apart on the first magnetic ring, a guide column corresponding to each sliding hole further fastened to the first magnetic ring, each guide column passing through the sliding hole and extended to the snap slot; a second magnetic ring correspondingly fastened in the second ring groove, in which a plurality of second magnetic members identical in quantity as the first magnetic members are distributed at equal interval; a shaft disc rotably fit to the connection ring structure, a via hole disposed thereon, the via hole correspondingly fit the stepping shaft of the bicycle, an unidirectional clutch bearing disposed inside the shaft disc so that the stepping shaft of the bicycle drives the shaft disc to unidirectionally rotate in the stepped rotational directional, a fastener corresponding to each snap slot disposed to a rear sidewall of the shaft disc, the fastener extended and passing through the snap slot, the fastener moving toward an exterior of the snap slot and pushing to the flexible element when the stepping shaft of the bicycle is stepped to rotate, the flexible element compressing and pushing the main sprocket base to drive the main sprocket base to rotate, the fastener disposed with a guide hole, the guide hole correspondingly fit the guide column; and a sensing unit correspondingly disposed to a rear side of the first magnetic ring and the second magnetic ring, wherein when the stepping shaft of the bicycle is stepped to rotate to drive the bicycle to advance forward, the sensing unit is capable of sensing a moving distance of the second magnetic ring lagging behind the first magnetic ring during rotation, which is a length that the flexible element is compressed.

The torque sensing gear structure further comprises a chassis correspondingly fit to a rear side of the main sprocket base, and the sensing unit is fastened to the chassis. The sensing unit is electrically connected to a calculator, and the calculator calculates a resistance generated by a stepping motion of the current user based upon an elastic coefficient of the flexible element and the length that the flexible element is compressed.

The sensing unit is disposed with two Hall Effect Sensors respectively corresponding to the first magnetic ring and the second magnetic ring, so that the moving distance of the second magnetic ring lagging behind the first magnetic ring is determined through a passing frequency of the first magnetic member and the second magnetic member.

The torque sensing gear structure further comprises a case correspondingly fit to an exterior of the connection ring structure so as to secure the flexible element in the arrangement space. Arrangement of the second magnetic member on the first magnetic ring is aligned to each of the first magnetic members. The sliding hole is an arc rectangular slot corresponding to the snap slot. The flexible element is a spring. The fastening racks are arranged at a divergence state. An external ring of the unidirectional clutch bearing is fastened to the shaft disc, and an inner ring of the unidirectional clutch bearing is fastened to the stepping shaft of the bicycle.

The torque sensing gear structure of the invention utilizes a structural incorporation such that a cutting structure of a shovel shape is produced at the front side, and a flattened leaning portion is disposed at a front end bottom of the cutting structure. Accordingly, it acts as a buffer surface when coming in contact with the bearing plate during the process of cutting the soft board, capable of preventing the bearing plate or tools from being damaged due to excessive force, thereby enhancing its service life. In addition, the invention has two first oblique walls at two sides. While simultaneously cutting it, the cut soft board will be slightly and upwardly tilted due to an oblique component force, so that the effect of a pierced vacuum can be generated to remove the adhesion from the bearing plate, allowing subsequent operating personnel to easily tear it off the bearing plate, thereby providing a high level of convenience in actual application.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
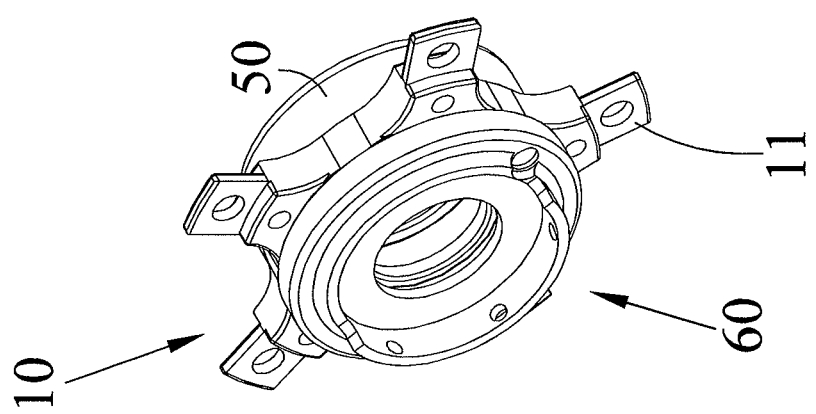
FIG. 1 is an appearance assembly drawing of a torque sensing gear structure according to the invention.
Figure 2:
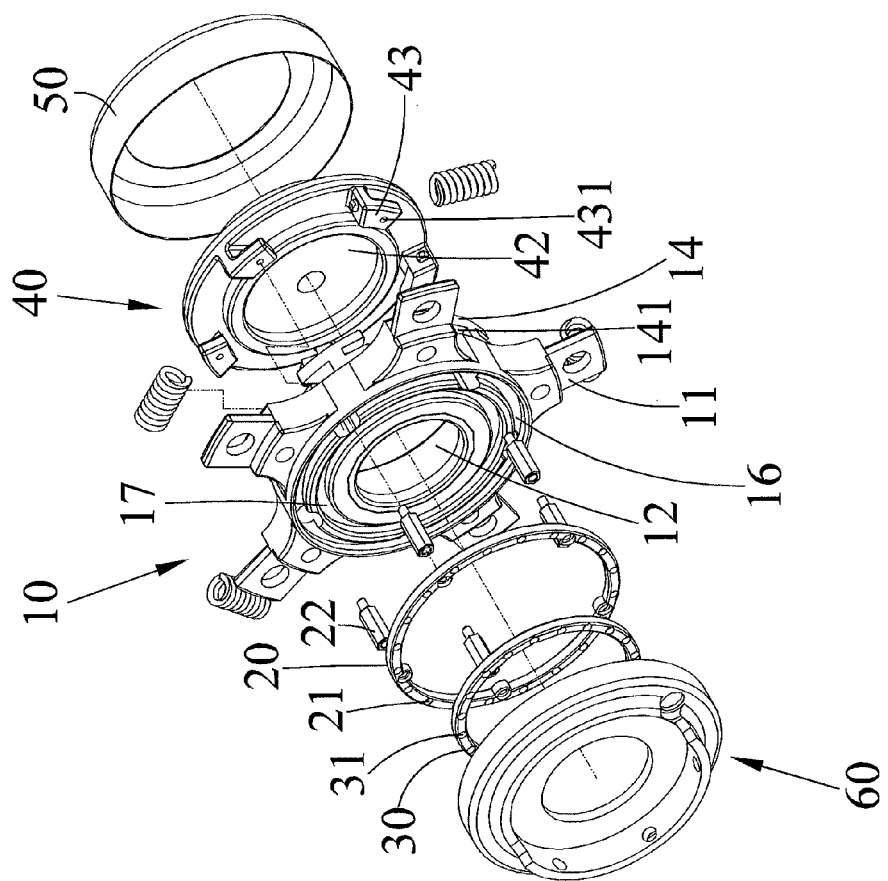
FIG. 2 is an appearance decomposition drawing of a torque sensing gear structure according to the invention.
Figure 3:
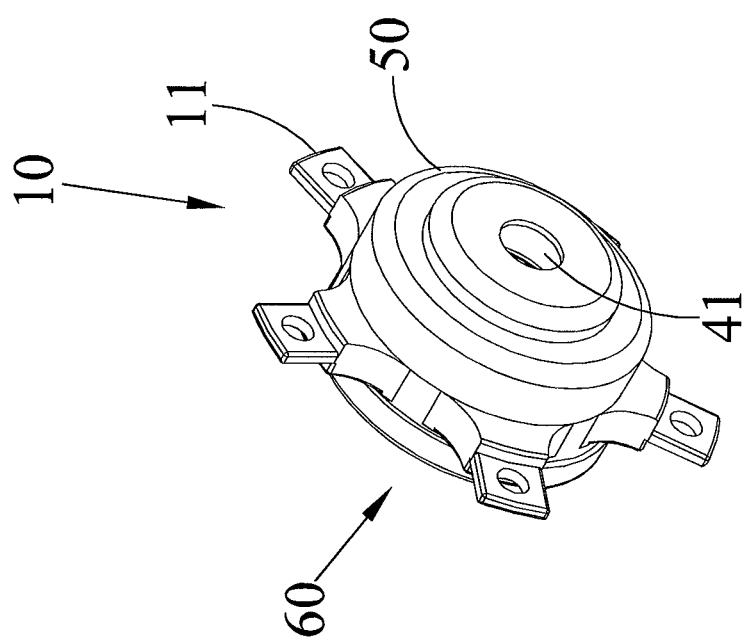
FIG. 3 is an appearance assembly drawing of a torque sensing gear structure at another visual angle according to the invention.
Figure 4:
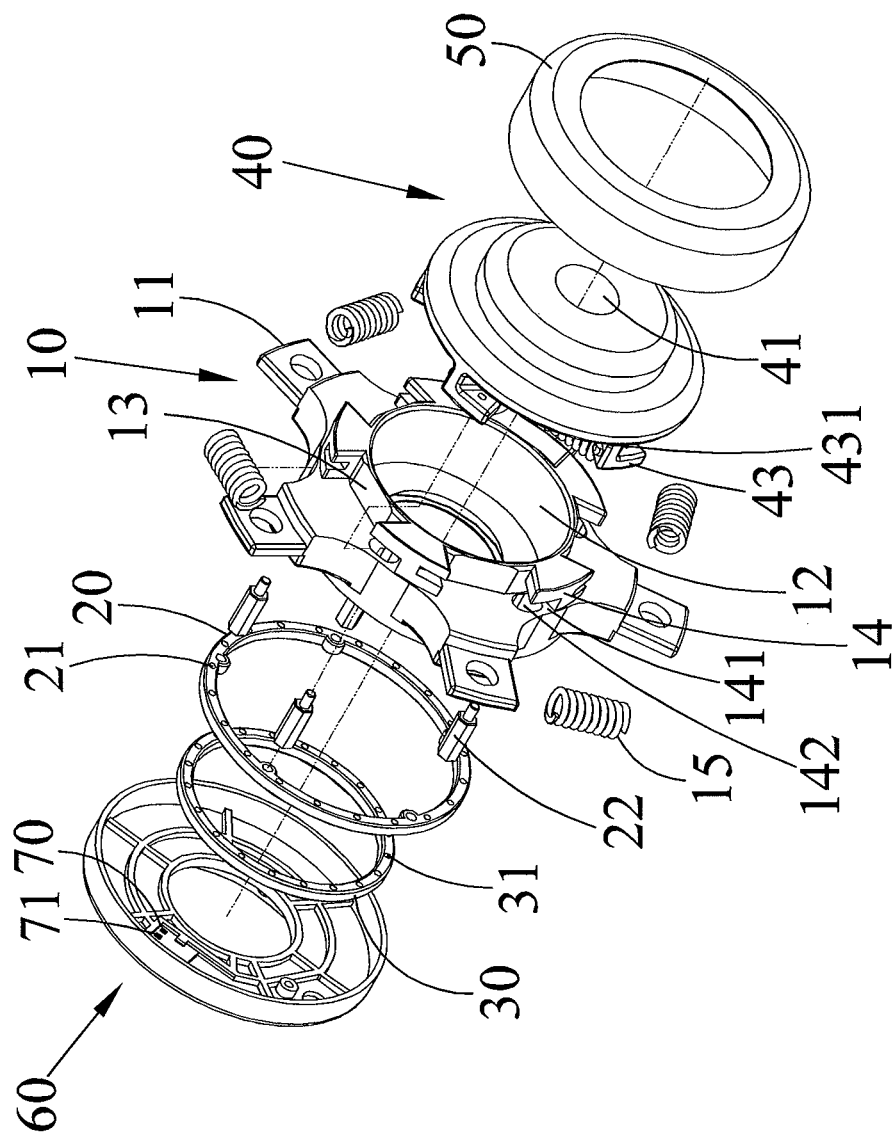
FIG. 4 is an appearance decomposition drawing of a torque sensing gear structure at another visual angle according to the invention.

With reference to FIG. 1 to FIG. 4, the invention is a torque sensing gear structure comprising a main sprocket base 10, a first magnetic ring 20, a second magnetic ring 30, a shaft disc 40, a case 50, a chassis 60 and a sensing unit 70.

The main sprocket base 10 is a base of fastening at least a driving sprocket of a bicycle and is a ring shape. An external ring of the main sprocket base is extended with a plurality of fastening rack 11 radially arranged. The fastening rack 11 is provided for a screw to fasten the driving sprocket of the bicycle. The center of the main sprocket base 10 is disposed with a shaft hole 12 passed by a stepping shaft of a bicycle. In addition, the main sprocket base 10 is correspondingly extended with a connection ring structure 13 toward the front side. An external ring of the connection structure 13 is disposed with a plurality of snap blocks 14. An arranging space is formed between the snap blocks 14. A flexible element 15 is arranged in each arranging space and can be a spring. Each snap block 14 is concavely disposed with a snap slot 141 at the same turning recess, and a sliding hole 142 pierces through a bottom wall of the snap slot 141. The sliding hole 142 can be an arc rectangular slot corresponding to the snap slot 141. In addition, a rear sidewall surface of the main sprocket base 10 is concavely disposed with a first ring groove 16. The first ring groove 16 is overlapped in each sliding hole 142. A second ring groove 17 corresponding to an inner side of the first ring groove 16 is concavely disposed and arranged at concentric state together with the first ring groove 16.

The first magnetic ring 20 is correspondingly disposed to the first ring groove 16 and can correspondingly rotate in the first ring groove 16. In addition, a plurality of first magnetic members 21 spaced at equal intervals is disposed on the first magnetic ring 20. A guide column 22 corresponding to each sliding hole 142 is further fixed with the first magnetic ring 20, and each guide column 22 passes through the sliding hole 142 to extend in the snap slot 141.

The second magnetic ring 30 is correspondingly fixed in the second ring groove 17. A plurality of second magnetic rings 30, in which its quantity is the same as the first magnetic member 21 of the first ring groove 16, is distributed at equal intervals. The configuration of the second magnetic member 31 corresponds to the first magnetic member 21.

The shaft disc 40 is rotably fit to a connection ring structure 13, and a via hole 41 is disposed thereon. The via hole 41 is correspondingly fit to a stepping shaft of the bicycle. An unidirectional clutch bearing 42 is disposed inside the shaft disc 40. An external ring of the unidirectional clutch bearing 42 is fastened to the shaft disc 40. An inner ring of the unidirectional clutch bearing 42 is fastened to the steeping shaft of the bicycle to allow the stepping shaft of the bicycle to unidirectionally drive the shaft disc 40 to rotate at the steeped rotational direction. A fastener 43 corresponding to each snap slot 141 is disposed to the rear sidewall of the shaft disc 40. The fastener 43 is extended and passes through the snap slot 141. The fastener 43 can be moved toward an exterior of the snap slot 141 and pushed to a flexible element 15 when the stepping shaft of the bicycle is stepped to rotate. After compressing the flexible element 15, the main sprocket base 10 is indirectly pushed and driven to rotate, so that the stepping shaft of the bicycle can unidirectionally drive the main sprocket base 10 for rotating while reversely showing idle rotation. In addition, the fastener 43 is disposed with a guide hole 431. The guide hole 431 is correspondingly fit to the guide column 22 such that the first magnetic ring 20 can be driven to rotate when the shaft disc 40 rotates.

The case 50 is correspondingly fit to the exterior of the connection ring structure 13 to further fasten the flexible element 15 in the arrangement space to prevent the flexible element 15 from dropping out of the arrangement space.

The chassis 60 is correspondingly fit to the rear side of the main sprocket base 10.

The sensing unit 70 corresponding to the first magnetic ring 20 and the second magnetic ring 30 is correspondingly disposed to the rear side of the chassis 60 and senses the moving distance, which is the length generated by compressing the flexible member 15 of the second magnetic ring 30 lagging behind the first magnetic ring 20 during rotation, when the stepping shaft of the bicycle is stepped to rotate to drive the bicycle for advancing. Alternatively, the sensing unit 70 is further electrically connected to a calculator, so that the resistance generated by the stepping motion of the user can be currently calculated according to the elastic coefficient of the flexible element 15 and the length the flexible element 15 is compressed. The sensing unit 70 is disposed with two Hall Effect Sensors 71 respectively corresponding to the first magnetic ring 20 and the second magnetic ring 30. Therefore, the real-time distance difference can be determined through the passing frequency of the first magnetic member 21 and the second magnetic member 31.

With the variation of designing the torque sensing gear structure of the invention, the torsion generated by the rider stepping the stepping shaft can be sensed through the sensing unit 70 assembled on the sprocket structure. By calculating the resistance currently generated by the stepping motion of the user, auxiliary power provided by the motor driving device real-time can be achieved to reduce the loading imposed by the user, thereby achieving the function of regulating power output any time. Not only the riding of the user can be properly supported, but also the inconvenience for the user frequently controlling the output power of the motor driving device can be prevented, thereby avoiding overpowered or too small output. Highly convenience in actual application is accordingly provided.

While the means of specific embodiments in the present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A torque sensing gear structure comprising:

a main sprocket base being a holder for fastening at least a driving sprocket of a bicycle, an external ring of the main sprocket base extended and disposed with a plurality of fastening racks, a shaft hole piercing through the main sprocket base to provide a stepping shaft of the bicycle passing thereto, a connection ring structure forwardly extended and disposed to the main sprocket base, an external ring wall surface of the connection ring structure disposed with a plurality of snap blocks mutually spaced, an arrangement space formed between the snap blocks, a flexible element arranged in the arrangement space, a snap slot concavely disposed to each snap block at a same turning place, a bottom wall of each snap slot disposed with a sliding hole, a first ring groove concavely disposed to a rear sidewall surface of the main sprocket base, the first ring groove overlapped in each sliding hole, a second ring groove corresponding to an inner side of the first ring groove further concavely disposed and concentrically arranged together with the first ring groove;

a first magnetic ring correspondingly disposed in the first ring groove, a plurality of first magnetic members disposed at a same interval apart on the first magnetic ring, a guide column corresponding to each sliding hole further fastened to the first magnetic ring, each guide column passing through the sliding hole and extended to the snap slot;

a second magnetic ring correspondingly fastened in the second ring groove, in which a plurality of second magnetic members identical in quantity as the first magnetic members are distributed at equal intervals;

a shaft disc rotably fit to the connection ring structure, a via hole disposed thereon, the via hole correspondingly fit to the stepping shaft of the bicycle, an unidirectional clutch bearing disposed inside the shaft disc so that the stepping shaft of the bicycle drives the shaft disc to unidirectionally rotate in the stepped rotational direction, a fastener corresponding to each snap slot disposed to a rear sidewall of the shaft disc, the fastener extended and passing through the snap slot, the fastener moving towards an exterior of the snap slot and pushing the flexible element when the stepping shaft of the bicycle is stepped to rotate, the flexible element compressing and pushing the main sprocket base to drive the main sprocket base to rotate, the fastener disposed with a guide hole, the guide hole correspondingly fit to the guide column; and a sensing unit correspondingly disposed to a rear side of the first magnetic ring and the second magnetic ring, wherein when the stepping shaft of the bicycle is stepped to rotate to drive the bicycle to advance forward, the sensing unit is capable of sensing a moving distance of the second magnetic ring lagging behind the first magnetic ring during rotation, which is a length that the flexible element is compressed.

2. The torque sensing gear structure of claim 1, wherein the torque sensing gear structure further comprises a chassis correspondingly fit to a rear side of the main sprocket base, and the sensing unit is fastened to the chassis.

3. The torque sensing gear structure of claim 1, wherein the sensing unit is electrically connected to a calculator, and the calculator calculates a resistance generated by a stepping motion of a current user based upon an elastic coefficient of the flexible element and the length that the flexible element is compressed.

4. The torque sensing gear structure of claim 1, wherein the sensing unit is disposed with two Hall Effect Sensors respectively corresponding to the first magnetic ring and the second magnetic ring, so that the moving distance of the second magnetic ring lagging behind the first magnetic ring is determined through a passing frequency of the first magnetic member and the second magnetic member.

5. The torque sensing gear structure of claim 1, wherein the torque sensing gear structure further comprises a case correspondingly fit to an exterior of the connection ring structure, so as to secure the flexible element in the arrangement space.

6. The torque sensing gear structure of claim 1, wherein arrangement of the second magnetic member on the first magnetic ring is aligned to each of the first magnetic members.

7. The torque sensing gear structure of claim 1, wherein the sliding hole is an arc rectangular slot corresponding to the snap slot.

8. The torque sensing gear structure of claim 1, wherein the flexible element is a spring.

9. The torque sensing gear structure of claim 1, wherein the fastening racks are arranged at a divergence state.

10. The torque sensing gear structure of claim 1, wherein an external ring of the unidirectional clutch bearing is fastened to the shaft disc, and an inner ring of the unidirectional clutch bearing is fastened to the stepping shaft of the bicycle.

* * * * *